United States Patent Office 3,823,010
Patented July 9, 1974

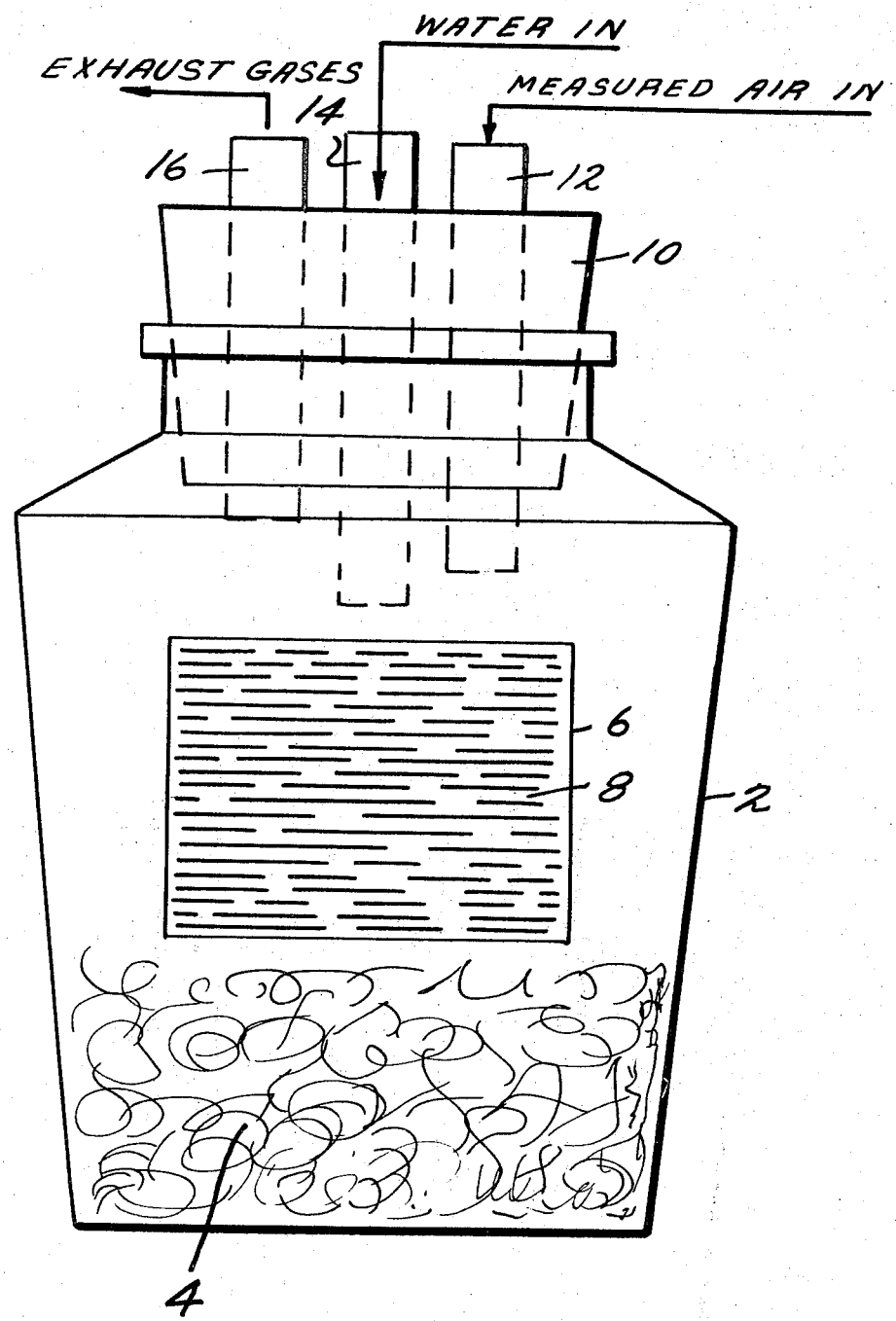

3,823,010
ELIMINATION OF H₂S FROM SLAG QUENCHING
George S. Tobias, Sewickley, Pa., assignor to
Envirotrol, Inc., Sewickley, Pa.
Filed Aug. 20, 1971, Ser. No. 173,588
Int. Cl. C21b *3/08*
U.S. Cl. 75—24                                    10 Claims

ABSTRACT OF THE DISCLOSURE $H_2S$ is eliminated from slag quenching by contacting the hot slag and/or quench gases with carbon containing materials such as activated carbon or coke in the presence of air. There can also be added various inorganic chemicals which react with hydrogen sulfide.

---

The present invention is directed to an economical process for the elimination of $H_2S$ from slag quenching in the iron and steel industry.

As used in the present disclosure and claims the term slag is intended to cover any slag in the iron or steel industry which contains sulfur or sulfur compounds giving rise to the formation of $H_2S$ upon quenching with water. The slag can be a slag used or formed in any of the known processes for making iron or steel, e.g., the basic open hearth process, the acid open hearth process, the Bessemer process, the basic oxygen process, etc. Illustrative slags which can be treated are disclosed in Kirk-Othmer Encyclopedia of Chemical Technology, 1st edition, Vol. 8, pages 32–34.

Water quenching of such slags generates considerable quantities of hydrogen sulfide. The problem of such $H_2S$ emissions, for example, has led to numerous regulations. Thus in Pennsylvania, Allegheny County Health Department Rules and Regulations, Article XVII Air Pollution Control, dated Jan. 1, 1970 reads:

"1708.2 Hydrogen Sulfide. The water quenching of slag at all slag handling locations or processing operations is prohibited unless the water quenching of slag is performed under conditions which prevent the discharge of all hydrogen sulfide or other air contaminants into the open air."

When hydrogen sulfide is treated with air in the presence of carbon (which serves as a catalyst) the reaction appears to be $H_2S + \frac{1}{2}O_2 \rightarrow S + H_2O$.

The carbon apparently adsorbs the sulfur formed. Activated carbon can be loaded with up to 25–30% by weight or more of sulfur, e.g. up to 60–65% of its weight.

While activated carbon is the preferred source of carbon because it can take up the most $H_2S$ and also can be readily regenerated for further use there can be any other carbon which can catalytically oxidize $H_2S$ in the presence of air, e.g. coke, bone char, F-coal (prepared from brown coal by activation with blue gases and steam). Also there can be used carbons, preferably activated carbon, impregnated with metals that form non-volatile metallic sulfides, e.g. iron, copper, chromium, zinc, nickel, cobalt, manganese, magnesium, aluminum. Also the carbon can be admixed or impregnated with chemicals, particularly inorganic compounds, that react with hydrogen sulfide to form non-volatile products such as calcium carbonate, calcium oxide, calcium hydroxide, sodium hydroxide, sodium carbonate, potassium carbonate, potassium hydroxide, barium oxide, barium hydroxide, magnesium oxide, magnesium hydroxide, magnesite, dead-burned magnesite, etc. In another aspect of the invention these inorganic compounds that react with hydrogen sulfide can be used alone without the carbon. There is also no need to add air with such compounds although it can be added.

The amount of air employed (pure oxygen can also be used but it is more expensive) is desirably at least the amount required to furnish the stoichiometric amount of oxygen to react with hydrogen sulfide derived from the slag according to the equation above. Desirably an excess of air is used, e.g. at least 1.4 times the stoichiometric amount. If a large excess of air is employed some of the sulfur will be oxidized to sulfur dioxide which will be converted in large part to sulfur trioxide in the presence of the carbon catalyst. Since these gases are both adsorbed by activated carbon they also will be removed and hence will not act as pollutants.

The process of the invention can be employed with any type of slag quenching. For example in one case, the molten slag is quenched directly with water. In another case, the molten slag is dumped into a pit and held there for a number of days. Then after the slag has solidified and the temperature has dropped (but is still well above 100° C.) the water quench is applied.

In such cases the invention can be used for example as follows:

(1) Water Quench of Slag After It Has Solidified in Pit

Prior to and/or during the water quench the slag is covered with a layer of material (carbon or inorganic chemical reactive with hydrogen sulfide) in granular or pulverized form. The material can be added dry or wet or in a slurry with some or all of the water. Additional air can be added by itself, with the carbon or with the water. The carbon can be used on a throwaway basis or it can be reused (1) after regeneration and recovery of sulfur by known means, e.g. with xylene or with aqueous ammonium sulfide, or (2) by charging it to the blast furnace.

(2) Water Quench of Molten Slag (a) A water slurry of activated carbon is employed to quench the molten slag, i.e. the carbon is added to some or all of the quench water.

(b) A simple containment and blower arrangement is used. The quench gases are passed through a bed of activated carbon to catalytically oxide the $H_2S$ in the presence of air to free sulfur and water. The carbon can be used on a throwaway basis or regenerated chemically to recover elemental sulfur.

While carbonaceous materials, particularly activated carbon is preferably employed there can be used other adsorbents or absorbents such as alumina, e.g. activated alumina, clays, bauxite and silica, e.g. silica gel.

The chemical reactants, e.g. lime, can be added in granular or pulverized form, in a slurry or water solution. Those compounds which are insoluble or have a relatively limited solubility in water e.g. hydrated lime, and are in granular form are preferred as chemical reactants.

Foaments can be used with the carbon, catalysts or chemicals to permit more time for $H_2S$ removal.

The invention will be understood best in connection with the drawings wherein the single figure illustrates an apparatus employed in a bench test of the invention.

Referring more specifically to the drawings there is provided a large container 2 having a layer 4 of vermiculite. Resting on the vermiculite is a 50 ml. Vycor crucible 6 containing slag 8 that had been heated to 800° F. in a muffle furnace. The container 2 is provided with a three hole stopper 10. In the first hole there is placed a tube 12 through which a measured amount of air can be introduced into the container 2. In the second hole there is placed a tube 14 through which a measured amount of water can be introduced into container 2. In the third hole there is placed a tube 16 through which the exhaust gases leave and are sent to a $H_2S$ detection tube (not shown) and thence to a volume measurement apparatus.

The above described apparatus was used in all of the following examples. In all of the examples the crucible contained 60 grams of slag that had been heated in a muffle furnace to 800° F. for at least 35 hours. The slag was Unquenched Ground Duquesne Slag as a mixture of equal parts by weight of 3½ x 8 mesh, 8 x 20 mesh and —20 mesh. In all but the blank test the slag was covered with 6 grams of the indicated test substance. All examples were run until the exhaust gas volume was 600 cc.:

TABLE 1

| | Ex. 1 | Ex. 2 | Ex. 3 | Ex. 4 | Ex. 5 |
|---|---|---|---|---|---|
| | Slag | Slag + carbon | Slag + coke | Slag + limestone | Slag + Ca(OH)$_2$ |
| P.p.m. H$_2$S | 160 | None | 10 | 65 | None |
| Smell test [1] | Plenty H$_2$S | No H$_2$S but plenty when crucible turned over. | No H$_2$S but plenty when crucible turned over. | Moderate H$_2$S | No H$_2$S but plenty when crucible turned over. |

[1] End of run.

In example 1 the time of the run was 17 minutes, the water was added at the same rate as in example 2 for a total of 56 cc. Air was added at a rate of 40 cc./minute.

In example 2 the carbon was Pittsburgh BPL activated carbon 12 x 30 mesh. It covered the slag as a layer of about ¼ inch. The time of the run was 17 minutes. Water was added at a rate of one cc./minute for 3 minutes, then at a rate of 2 cc./minute for one minute, then at a rate of 3 cc./minute for 7 minutes and then at a rate of 5 cc./minute for 6 minutes for a total of 56 cc. of water. The air was added at a rate of 40 cc./minute.

In example 3 the coke had been crushed to pass 20 mesh. The time of the run was 19 minutes. The water was added at a rate of one cc./minute for 3 minutes, at 2 cc./minute for 1 minute, at 3 cc./minute for 7 minutes and at 5 cc./minute for 8 minutes for a total of 66 cc. Air was added at a rate of 40 cc./minute. The coke was about a 1/16 to 1/8 inch layer but in several places did not cover the slag.

In example 4 the limestone was powdered. The layer was a scant 1/16 inch and about 15–20% of the total area of the slag was not covered. The time of the run was 17 minutes and the water and air were added at the same rate as in example 2.

In example 5 there was used powdered Ca(OH)$_2$. The layer was about ¼ inch. The time of the run was 19 minutes and the water and air were added at the same rate as in example 3.

What is claimed is:

1. In a process of quenching a sulfur-containing slag with water whereby hydrogen sulfide is formed, the improvement comprising contacting the slag at a time not later than the time of said quenching with an oxygen source and an adsorbent for sulfur whereby said hydrogen sulfide is converted to sulfur and adsorbed on said adsorbent thereby substantially eliminating said hydrogen sulfide.

2. A process according to claim 1 wherein the adsorbent is carbon.

3. A process according to claim 1 wherein the oxygen source is air and is used in an amount sufficient to supply the stoichiometric amount of oxygen to react with all of the H$_2$S formed from the slag by satisfying the reaction $$H_2S + \tfrac{1}{2}O_2 \rightarrow S + H_2O.$$

4. A process according to claim 3 wherein the adsorbent is carbon.

5. A process according to claim 4 wherein the carbon is in the form of coke.

6. A process according to claim 4 wherein the carbon is in the form of activated carbon.

7. A process according to claim 4 comprising supplying the carbon as a cover layer to hot solidified slag not later than the time of adding the quench water.

8. A process according to claim 4 wherein the carbon is added as a slurry in quench water to the molten slag.

9. A process according to claim 1 wherein the adsorbent is activated carbon.

10. A process according to claim 1 wherein the quenching is commenced at a temperature of 800° F.

References Cited

UNITED STATES PATENTS

| 2,023,511 | 12/1935 | Brosius | 65—20 |
| 3,116,970 | 1/1964 | Storp et al. | 23—225 P |
| 3,249,402 | 5/1966 | Smyers et al. | 23—181 X |

FOREIGN PATENTS

| 1,178,802 | 10/1964 | Germany | 75—24 |

L. DEWAYNE RUTLEDGE, Primary Examiner

M. J. ANDREWS, Assistant Examiner

U.S. Cl. X.R.

65—19; 264—11